United States Patent [19]
Jacobs et al.

[11] Patent Number: 5,457,379
[45] Date of Patent: Oct. 10, 1995

[54] HIGH EFFICIENCY SWITCH MODE REGULATOR

[75] Inventors: Mark E. Jacobs, Dallas; Richard W. Farrington, Mesquite; Vijayan J. Thottuvelil, Plano, all of Tex.

[73] Assignee: AT&T IPM Corp., Coral Gables, Fla.

[21] Appl. No.: 137,682

[22] Filed: Oct. 15, 1993

[51] Int. Cl.⁶ ............................................. G05F 1/10
[52] U.S. Cl. ................................. 323/222; 323/282
[58] Field of Search ........................... 323/222, 282, 323/351, 345

[56] References Cited

U.S. PATENT DOCUMENTS

| | | | |
|---|---|---|---|
| 3,523,239 | 12/1967 | Heard | 323/222 |
| 5,293,111 | 3/1994 | Weinberg | 323/222 |
| 5,313,382 | 5/1994 | Farrington | 323/222 X |

OTHER PUBLICATIONS

"A Family of Dc-to-Dc PWM Converters Using a New ZVS Commutation Cell", IEEE Proceedings, Martins, D. C., Falcondes, M. J., de Seixas, J. M., Brilhante, J. A., Barbi, I., 1993 pp. 524–530.

"A New Buck ZVT PWM Converter", IEEE Proceedings, do Prado, R. N., May 1993, pp. 73–80.

*Primary Examiner*—A. D. Pellinen
*Assistant Examiner*—Y. Jessica Han
*Attorney, Agent, or Firm*—Alfred C. Steinmetz

[57] ABSTRACT

A switching boost regulator, including auxiliary circuitry having an auxiliary switch and inductor connected to operate the regulator in a zero-voltage transition mode, achieves substantial efficiency improvement by limiting losses in the auxiliary circuitry dedicated to achieving zero-voltage transition operation. Loss reduction circuitry included with the auxiliary circuitry cooperatively operates to limit turn-on and conduction losses and to suppress ringing of the components of the auxiliary circuit.

10 Claims, 3 Drawing Sheets

HIGH EFFICIENCY SWITCH MODE REGULATOR

FIELD OF THE INVENTION

This invention relates to switching mode regulators and in particular highly efficient switching mode regulators in which the losses of switching components are minimized.

BACKGROUND OF THE INVENTION

Switching mode regulators have wide application as low loss power supplies. One particular application is at the front end of power rectifiers where they are controlled, by pulse width modulation techniques, to provide enhanced power factor at the input AC power line feed. Regulators are chosen which are highly efficient so that the overall power processing system is highly efficient. Accordingly switching regulators are designed using controlled wave forms and careful timing to minimize losses at the switching transitions of the various non-linear switching components. These regulators are embodied in circuit topologies that emphasize near zero or zero-voltage switching. In zero voltage switching the conductivity transition to the conducting state of the active power switch occurs when the voltage of the power switch is at a substantially zero level. In some arrangements other switching components of the circuit may be controlled to switch at a zero or near zero voltage.

A particular example of such a circuit is a boost regulator designed to achieve zero or near zero voltage switching. Such a circuit may indeed achieve the low loss or lossless switching criteria for at least the active power switch but the very circuitry added for achieving near zero or zero-voltage switching induces other transient phenomena that reduces the efficiency gains of zero voltage switching and further induces undesirable stress on other circuit components of the power regulator.

SUMMARY OF THE INVENTION

A switching boost regulator, including auxiliary circuitry having an auxiliary switch and inductor connected to operate the regulator in a near zero or zero-voltage switching mode (herein after designated ZVS), achieves substantial efficiency improvement by limiting losses in the auxiliary circuitry dedicated to achieving ZVS operation. Loss reduction circuitry included with the auxiliary circuitry cooperatively operates to limit turn-on and conduction losses and to suppress ringing of the components of the auxiliary circuit.

The loss reduction circuitry includes circuitry for limiting conductive and switching losses in passive switching devices of the auxiliary circuit used for clamping and rectification. Circuitry for limiting ringing and peak inverse voltages of the auxiliary switch include circuitry for absorption of transient energy of a clamping circuit and circuitry for dissipating energy stored in magnetic storage elements included in the auxiliary circuit.

DETAILED DESCRIPTION

Figure 1:
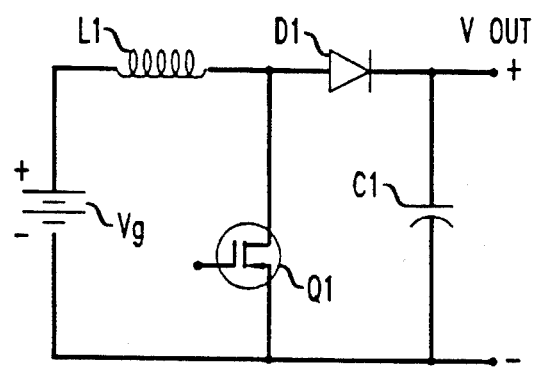
FIG. 1 is a schematic of a conventional switching boost type voltage regulator.

A typical prior art boost switching voltage regulator, shown in FIG. 1, is operative to convert an input DC voltage, such as $V_g$, supplied at the input terminal connected to inductor $L_1$ to a DC output voltage at a higher DC voltage level at the output terminal $V_{out}$. This voltage level transformation is accomplished by periodically biasing the power switch $Q_1$ into a conducting state to establish a current flow through the inductor $L_1$. The power switch $Q_1$ is periodically biased non conducting, following each periodic conducting interval, and the inertial current characteristics of the inductor $L_1$ at this time biases the rectifying diode $D_1$ conducting to couple the stored energy in the inductor $L_1$ to the output terminal at a higher DC voltage level than the voltage level of the input DC voltage $V_g$. The boost regulator in the form shown in FIG. 1 experiences significant switching loss in the power switch $Q_1$ and the rectifying diode $D_1$. In many applications this reduced efficiency is not acceptable.

A boost type switching voltage regulator can be designed to employ ZVS switching techniques. This significantly increases efficiency by operating both passive and active switching components to change their respective conductive states during a transition period in which the switching component voltage is held essentially to a zero value.

Figure 2:
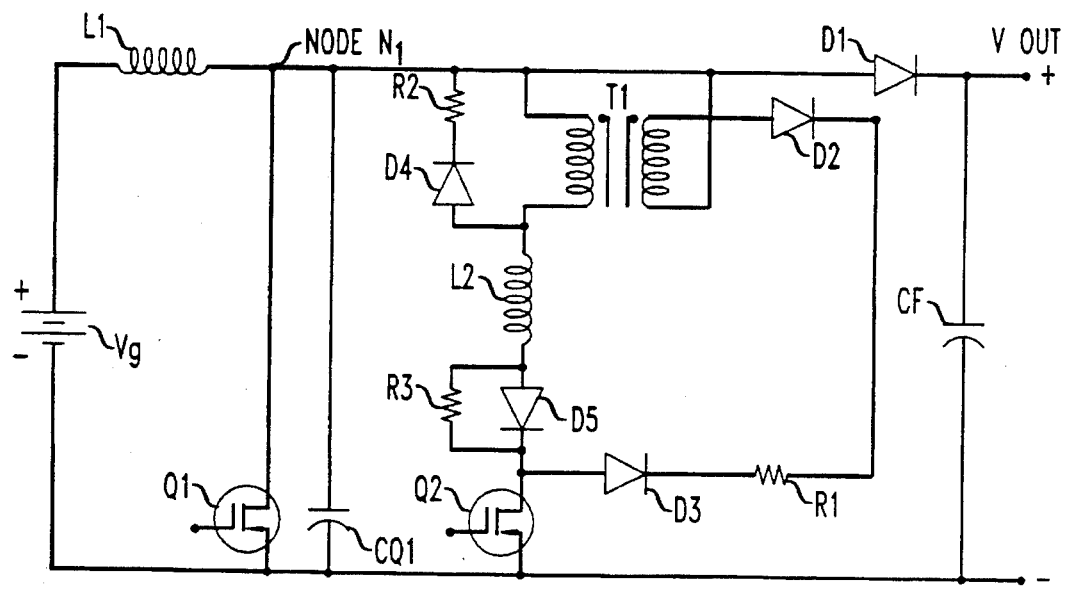
FIG. 2 is a schematic of a switching boost type voltage regulator with reduced loss ZVS circuitry.

In the boost regulator shown in the FIG. 2 an auxiliary network including the FET auxiliary switch $Q_2$ and inductor $L_2$ is operative to enable ZVS switching of the power switch $Q_1$ and is further operative to absorb energy associated with the switching of the rectifying diode $D_1$. The diode energy induced by the switching of the diode $D_1$, and absorbed by the network, is that energy associated with the current flow occurring during its reverse recovery when the diode transitions from a conducting to a blocking mode. The power switch $Q_1$ has an energy loss due to non-zero voltage/current dissipation and is partly due to the charge stored by its inherent capacitance $C_{Q1}$. Application of this ZVS network circuitry typically reduces these losses occurring in the primary power train by about one-half.

The auxiliary network of the ZVS regulator, comprising the auxiliary switch $Q_2$, and the inductor $L_2$ suffers considerable turn-on and conduction loss, on its own behalf. This loss detracts from the energy savings achieved in the main power train circuitry. Further losses are incurred in the auxiliary network by ringing of the voltage of the auxiliary switch $Q_2$ occurring at switching transitions. This ringing adversely affects the EMI performance of the overall circuit.

A modification of the auxiliary network to improve the efficiency of the ZVS circuitry includes addition of an inductor $T_1$ having two windings, $T_{W1}$ and $T_{W2}$, inductively coupled and further with the winding $T_{W1}$ electrically connected in series with the winding $T_{W2}$. Winding $T_{W1}$ is electrically connected in series with the auxiliary switch $Q_2$ in order to significantly reduce the current level switched by the auxiliary switch $Q_2$. The second winding $T_{W2}$ is connected to the output $V_{out}$ by a clamping diode $D_2$. The reverse recovery of this diode $D_2$ induces added significant switching and conduction losses into the regulator.

Further loss reduction circuitry is added to the auxiliary network in order to increase the overall efficiency of the regulator by reducing the currents conducted by the auxiliary network to a level significantly less than the output current of the regulator and by eliminating or at least significantly reducing reverse recovery losses of diodes in the regulator. Additional circuitry is also included in the auxiliary network to absorb losses and reduce ringing induced by the switching action of the auxiliary network components.

In the basic operation of the regulator of FIG. 2 current is initially flowing from the voltage source $V_g$ through the inductor $L_1$ and diode $D_1$ to the output terminal $V_{out}$ before either of the active switches, $Q_1$ or $Q_2$, is biased conducting. The first switch turned on in each cycle of operation is the auxiliary switch $Q_2$. The switch $Q_2$ is biased conducting, at timing mark $T_0$, by a pulse identified as waveform $V_{GS2}$ in FIG. 3, just prior to turn-on of the power switch $Q_1$. The conducting interval of auxiliary switch $Q_2$ is coincident with the duration of the driving pulse voltage $V_{GS2}$ which determines the conducting interval of switch $Q_2$. The voltage pulse driving power switch $Q_1$, as shown by waveform $V_{GS2}$ in FIG. 3, has a duration extending from $T_1$ to $T_3$. The corresponding duration of conductivity of the auxiliary switch $Q_2$ is, as shown, timed to fully cover the turn-on transition interval of the power switch $Q_1$.

The conduction of the auxiliary switch $Q_2$ causes a first current to build up in the inductor $L_2$. This first current is shown by the waveform $I_{LR}$ shown in the FIG. 3 at the timing mark $T_0$. The inductively coupled windings $T_{W1}$ and $T_{W2}$, of the magnetic device $T_1$, cause a second current proportional to the first current to flow in the forward biased diode $D_2$. When the sum of the first and second currents (shown by waveforms $I_{LR}$ and $I_{TS2}$ in FIG. 3) equals or exceeds the input current the voltage at the node $N_1$ decays to zero. This enables the full discharge of the inherent capacitance $C_R$ of the power switch $Q_1$. The diode $D_1$ is reverse biased and the reverse recovery energy of the diode $D_1$ is absorbed by the inductor $L_2$. With the voltage at node $N_1$ at essentially zero the power switch $Q_1$ is biased conducting without switching loss. The auxiliary switch $Q_2$ is subsequently biased non-conducting at timing mark $T_3$, shortly after the power switch $Q_1$ becomes conducting. With the auxiliary switch $Q_2$ non-conducting the energy stored in the inductor $L_2$ is returned to the output terminal $V_{out}$. Its conduction path, to the terminal $V_{out}$, includes the current flow through the diode $D_3$, and also current flow via the inductive coupling provided by the winding $T_{W1}$ and passing through the diode $D_2$. The subsequent biasing of the power switch $Q_1$, to a non-conducting state, at the timing mark $T_5$, is in response to regulation control circuitry to regulate the voltage at the output.

The voltage across the auxiliary switch $Q_2$ must be limited to its peak voltage rating. Clamping of this voltage is provided by the diode $D_3$ connecting the auxiliary switch drain to the output $V_{out}$. The voltage of auxiliary switch $Q_2$ is hence clamped to the output voltage. The current in the diode $D_3$ must be reduced to substantially zero when the auxiliary switch $Q_2$ is biased non-conducting, to avoid efficiency reducing reverse-recovery losses in the diode $D_3$. The resistor $R_1$ connected in series with the diode $D_3$ absorbs these reverse recovery losses. The value of the resistor $R_1$, connected in series with the diode $D_3$, is idealy of a resistance with a value roughly equal to one-half of the square root of $L_2/C$, where C is the total capacitance appearing between the drain and source terminals of the auxiliary switch $Q_2$. A practical value of resistor $R_1$ is of the order of a hundred ohms.

The resetting of the magnetizing inductance of the magnetic device $T_1$ places voltage stress on the diode $D_2$. The reset energy is controlled with a dissipative network, comprising the resistor $R_2$ and the diode $D_4$, for dissipating the energy of the magnetizing inductance This energy is shown by the current waveform $I_{TS2}$ shown in FIG. 3 between the timing marks $T_3$ and $T_7$. A practical value of resistor $R_2$ is of the order of several kilohms.

The energy associated with the reverse recovery of the diode $D_3$, when the auxiliary switch $Q_2$ is turned on, is absorbed by a sub-network, including the diode $D_5$ connected in parallel with the resistor $R_3$. This sub-network is connected in series with the auxiliary switch $Q_2$. This sub-network absorbs the reverse recovery energy of the diode $D_3$ and further eliminates the tendency of the ZVS circuitry to ring following turn off of the auxiliary switch $Q_2$. A practical value of the resistor $R_3$ is of the order of several hundreds of ohms.

Figure 3:
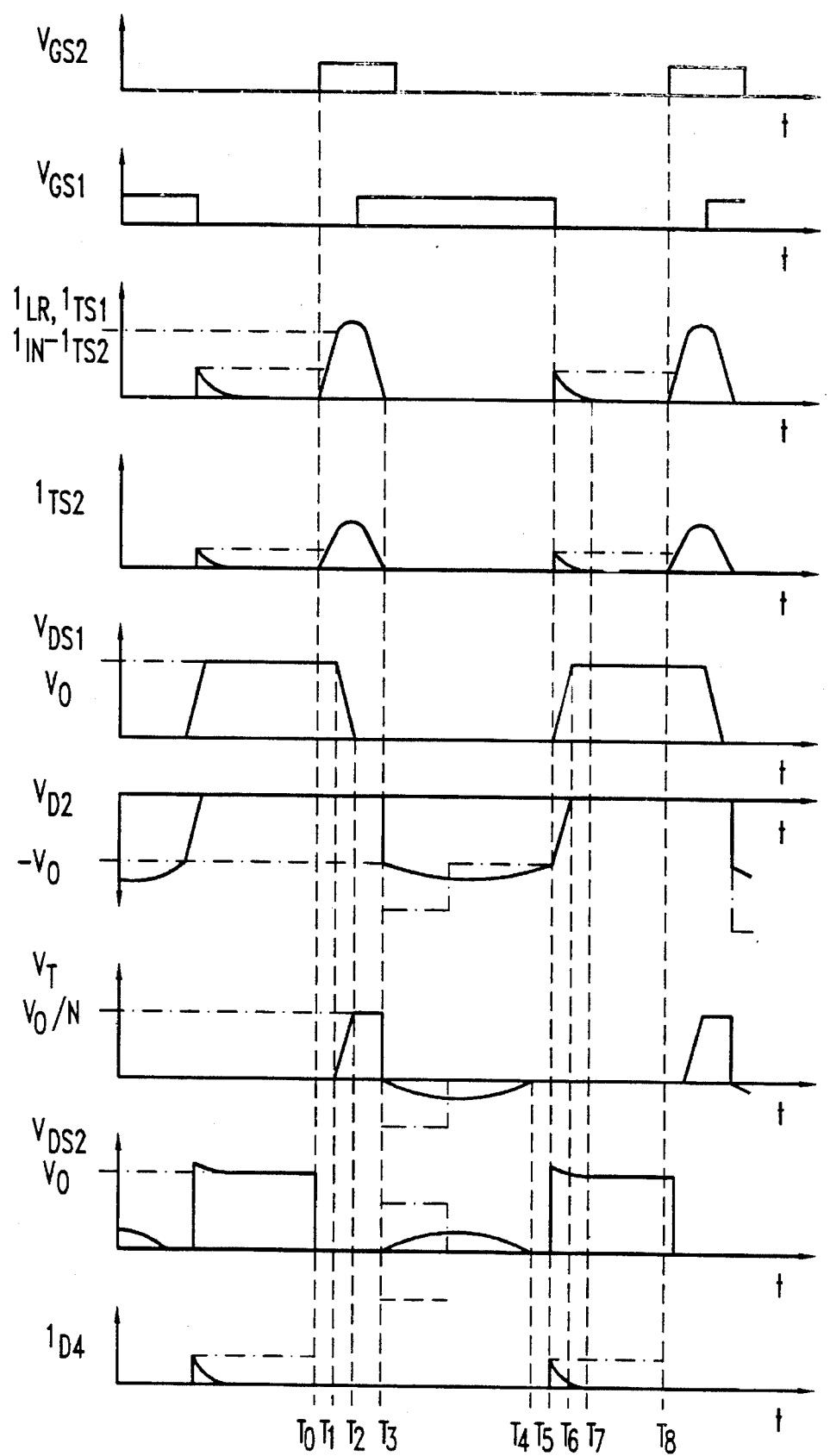
FIG. 3 is a graph of a plurality of operating waveforms of the switching boost regulator of FIG. 2.

The operation of the circuit may be readily understood by considering its operation as a sequence of seven distinct operational modes in combination with an examination of the wave forms of FIG. 3 associated with the circuit of FIG. 2. All the waveforms are keyed to the common timing marks $T_x$ where x is designated 0 through 8. Each waveform in FIG. 2 is designated as V for voltage and I for current and I and V are accompanied by subscripts identifying the component having that particular waveform characteristic. Waveforms $V_{GS1}$ and $V_{GS2}$ represent the voltage pulses applied to the power switch $Q_1$ and the auxiliary switch $Q_2$ respectively. $I_{LR}$, $I_{TS1}$ and $I_{TS2}$ are the current waveforms of current through inductor $L_2$ and winding $T_{W1}$ and winding $T_{W2}$, respectively. Voltage waveform $V_{DS1}$ is the voltage across the drain-source electrodes of power switch $Q_1$. The voltage waveform $V_{D2}$ is the the voltage across the drain-source electrodes of the auxiliary switch $Q_2$. The voltage waveform $V_{D2}$ is the voltage across the diode $D_2$. Voltage waveform $V_T$ is the voltage occurring across the winding $T_{W1}$. The current through diode $D_3$ is shown by waveform $I_{D3}$. These waveforms when taken in connection with the following description will enable those skilled in the art to understand the operation of the circuit of FIG. 2.

The initial operating conditions, prior to the timing mark $T_0$, are that the power switch $Q_1$ and the auxiliary switch $Q_2$ are both non conducting. Power supplied by energy stored in the circuit is being transmitted to the output through the dioded $D_1$.

The initial operating stage encompasses the time interval between the timing marks $T_0$ and $T_1$. The auxiliary switch $Q_2$ turns on at timing mark $T_0$ and in response the current flow $I_{L2}$ through the inductor $L_2$ begins to increase linearly. The output current $I_{D1}$ continues to flow in the output diode $D_1$ and operates to clamp the the voltage across the coupled winding of the inductive component $T_1$ to a zero voltage. The current, shown by waveform $I_{L2}$, flowing through the inductor $L_2$ continues to increase linearly. This same current appears in the coupled winding $t_{W1}$ of the magnetic device $T_1$. This rate of this increase is scaled in response to the winding ratio N:1 of the coupled windings of the magnetic device $T_1$. The current flow in the diode $D_1$ decreases at the same rate as the sum of currents through the two windings of the magnetic device $T_1$ increases. At the timing mark $T_1$ the sum of the currents flowing through the windings of the magnetic device $T_1$ becomes equal to the magnitude input current $I_{IN}$ flowing through the inductor $L_1$. Hence the diode $D_1$ turns off in a soft manner (i.e., with mild reverse recovery characteristics).

In the next operational stage, comprising the time interval between the timing marks $T_1$ and $T_2$, the diode $D_1$ is reverse biased at the timing mark $T_1$. The sum of the currents through the windings of the magnetic device $T_1$ continue to increase causing charge to be removed in a resonant manner from the capacitor $C_{Q1}$ which is in parallel with the power switch $Q_1$ and which may comprise the inherent capacitance or an external capacitance or a combination of both. The energy stored on this capacitor is eventually transferred to the output. With the diode $D_1$ nonconducting, a voltage is developed across the windings of the magnetic device $T_1$. When the capacitance $C_{Q1}$ is fully discharged the the power switch $Q_1$ is turned on with a zero-voltage transition from non-conducting to conducting state.

At the beginning of the next stage of operation, covered by the interval from timing mark $T_2$ to timing mark $T_3$, the power switch $Q_1$ is conducting. The reflected output voltage appears across the winding $T_1$ of the magnetic device $T_1$. This voltage resets the inductor $L_2$ whose current is linearly decreasing. The current through the inductor $L_2$ attains a zero value at the timing mark $T_3$ resulting in a zero current turn-off of the auxiliary switch $Q_2$. At this time all the input current has been commutated to the power switch $Q_1$.

During the subsequent operational stage encompassing a time interval between the timing marks $T_3$ and $T_4$, the core of the magnetic device $T_1$ resets through a network comprising the diode $D_4$ and a resistor $R_2$. This network is connected in parallel with the winding $T_1$ and provides a controlled reset which limits stresses appearing across the diode $D_2$.

The power switch $Q_1$ is turned off at the timing mark $T_4$. The voltage across power switch $Q_1$ then increases linearly as the input current charges the capacitance $C_{Q1}$. The inherent capacitance associated with the auxiliary switch $Q_2$ is charged during the time interval bracketed by the timing marks $T_5$ and $T_6$. The charging current flows through the winding $T_{W1}$ and the inductor $L_2$, and a current is established in the winding $T_{W2}$.

As the voltage across the power switch $Q_1$ increases to the value of the output voltage, the voltage across the auxiliary switch $Q_2$ clamps to the value of the output voltage as the diode $D_2$ conducts. The inductor $L_2$ must be reset to avoid continued current flow through the diodes $D_2$ and $D_4$ during the non-conducting interval of the power switch $Q_1$. A resistor $R_1$ is included to insure the reset of inductor $L_2$. $R_1$ further drives the currents in the diodes $D_4$ and $D_2$ to zero to prevent a damaging reverse recovery when the auxiliary switch $Q_2$ is turned on to initiate the next switching cycle. By the occurrence of the timing mark $T_6$, the voltage across the power switch $Q_1$ has increased to the value of the output voltage and the diode $D_1$ has been biased conducting and the inductor $L_2$ has been fully reset.

During the final interval between the timing marks $T_6$ and $T_7$ both the switches $Q_1$ and $Q_2$ are biased non-conducting and the input current is delivered to the load, via the diode $D_1$. The subsequent switching cycle is initiated at timing mark $T_8$ when the auxiliary switch $Q_2$ is biased conducting.

The diode $D_3$ is an essential component for minimizing the negative effects caused by resonant interaction of the inherent capacitance of the diode $D_2$ and the inherent capacitance of the auxiliary switch $Q_2$ and the inductor $L_2$ at the turn-off of the power switch $Q_2$ ( at the timing mark $T_3$).

The dashed lines appearing in the waveforms of FIG. 2 represent a different trajectory of waveforms that appear in the auxiliary network which do not incorporate the resistors $R_1$, $R_2$ and $R_3$ and the diodes $D_3$ and $D_5$.

Figure 4:
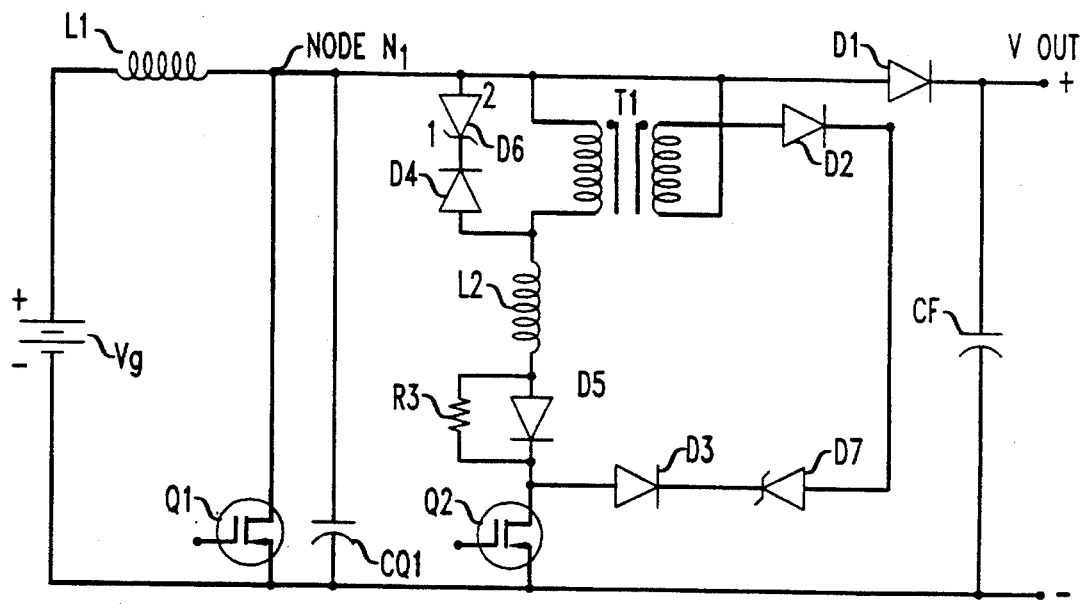
FIG. 4 is a schematic of another switching boost type voltage regulator with reduced loss ZVS circuitry.

An alternative version of the circuit of FIG. 2 is shown in the FIG. 4. While similar in operation to the circuit of FIG. 2 the semiconductor voltage breakdown devices $D_6$ and $D_7$ are used to achieve the objectives of reducing transients in the circuitry associated with the auxiliary switch $Q_2$.

We claim:

1. A power converter comprising:

an input and an output;

an inductive energy storage device connected to the input and to a rectifying device which is connected in turn to the output;

a primary power switch connecting an electrical node, common to the inductive energy storage device and to the rectifying device, to a line common to the input and output;

an auxiliary circuit for driving a voltage at the electrical node substantially to zero during a turn-on transition of the primary power switch, and connecting the electrical node to the line common to the input and output, and including; a magnetic component having first and second inductively coupled windings the first and second windings being further electrically connected in series connection and the first winding connected to the electrical node; an auxiliary switch, operated in a conducting mode in advance of an interval of turn-on of the primary power switch, and an inductor interconnecting the auxiliary switch to the first inductively coupled winding;

a clamping circuit connected for limiting a peak voltage across the auxiliary switch to a voltage at the output and including a unidirectional conducting device and a voltage absorbing device connected for rapidly driving a reverse current in the unidirectional conducting device to substantially zero.

2. A power converter as claimed in claim 1, further comprising:

a second unidirectional conducting device interconnecting the second winding to the output; and circuitry connected for discharging magnetic energy of the magnetic component, including an energy dissipating element and a third unidirectional conducting device.

3. A power converter as claimed in claim 2, further comprising:

an energy absorbing circuit connected for absorbing momentary reverse currents of the first and second unidirectional conducting devices and further connected for limiting tinging at turn-off of the auxiliary switch, and including an impedance and a fourth unidirectional conducting device.

4. A power converter as claimed in claim 3, wherein;

the impedance and fourth unidirectional conducting device being connected in a series absorbing circuit and the series absorbing circuit being connected in parallel with the first winding.

5. A power converter as claimed in claim 1, wherein;

the voltage absorbing device is a resistive device.

6. A power converter as claimed in claim 1, wherein:

the voltage absorbing device is a breakdown dime.

7. A power converter as claimed in claim 5, wherein; the auxiliary switch is a FET device; and the resistive device has a resistance value substantially equal to one-half a square root of the ratio of the inductance of the inductor to a drain source capacitance of the auxiliary switch.

8. A boost converter including an energy storage inductor, a rectifying diode coupling the inductor to an output and a power switch for controlling energy storage in the inductor;

circuitry for enabling the power switch to operate with zero voltage switching; including:

a network connected in parallel with the power switch and activated by an auxiliary switch for driving a terminal of the power switch to a substantially zero voltage at a conduction transition of [of] the power switch;

circuitry for limiting losses incurred in the network including;

clamping circuitry for limiting a voltage at a terminal of the auxiliary switch; and a first and second winding magnetically coupled to one another and electrically connected in series and with the first winding connected in series with the auxiliary switch; and discharge circuitry connected to the first and second winding for discharging magnetic energy of the first and second magnetically coupled windings.

9. A boost converter as claimed in claim 8; wherein:

the clamping circuitry includes a diode and the circuitry for limiting losses includes a diode-resistive network connected to limit reverse recovery of the diode.

10. A boost converter as claimed in claim 9; wherein:

a resistive device of the diode resistive network has a resistance value substantially equal to one-half a square root of the ratio of an inductance of the network to a drain source capacitance of the auxiliary switch.